Patented Oct. 6, 1953

2,654,776

UNITED STATES PATENT OFFICE 2,654,776

NEW AZAPENTYLENE DIAMMONIUM SALT

Karl Miescher, Riehen, and Adrian Marxer, Basel, Switzerland, assignors to Ciba Pharmaceutical Products, Inc., Summit, N. J.

No Drawing. Application November 25, 1952, Serial No. 322,546. In Switzerland December 12, 1951

1 Claim. (Cl. 260—501)

This invention relates to a new heptaalkyl-3-aza-pentylene-(1,5)-diammonium salt, namely N,N,N',N',3 - pentamethyl - N,N' - diethyl - 3-aza - pentylene - (1,5) - diammonium di - d-tartrate of the formula

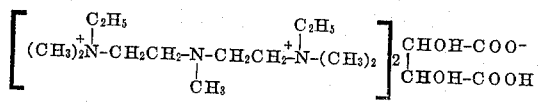

Various heptaalkyl - 3 - aza - pentylene - (1,5) - diammonium salts are described and claimed in our application Ser. No. 142,712, filed February 6, 1950, for quaternated azo-pentane amines. Of special importance is the N,N,N',N',3 - pentamethyl - N,N' - diethyl - 3 - aza - pentylene-(1,5)-diammonium-dibromide which is used as a medicament. It is, however, very hygroscopic. Tablets cannot be produced from this substance and therapy is confined to the use of solutions. Likewise, a number of corresponding salts of other inorganic or organic acids have this unfavorable property. The chloride, sulfate, methosulfate, acetate, diacetate, benzoate, dibenzoate, disuccinate, citrate and dicitrate, for example, deliquesce in moist air.

The new salt of the present invention has the special physical property of not being deliquescent, even in air. Accordingly, it does not have the disadvantages of the aforementioned salts and can very well be tableted. It has highly valuable pharmacological properties and can be used as a ganglionic blocker not only in the form of solutions, but in particular also as tablets.

The new salt is prepared by treating, e. g. the N,N,N',N',3 - pentamethyl - N,N' - diethyl - 3-aza - pentylene - (1,5) - diammonium - dibromide in water with silver oxide. The resultant diammonium dihydroxy compound is then reacted with an aqueous solution of d-tartaric acid and the di-d-tartrate formed is isolated.

The following example illustrates the invention, the relation between part by weight and part by volume being the same as that between the gram and the cubic centimeter:

Example

From 39.1 parts by weight of N,N,N',N',3-pentamethyl - N,N' - diethyl - 3 - aza - pentylene-(1,5)-diammonium dibromide in 100 parts by volume of water, the diammonium dihydroxide is produced by shaking with a small excess of silver oxide in 50 parts by volume of water. The product is filtered with suction from silver bromide produced and the aqueous solution treated with 30.0 parts by weight of d-tartaric acid in 50 parts by volume of water. Considerable concentration is effected under reduced pressure, followed by treatment with 100 parts by volume of alcohol and complete evaporation to dryness. The residue is treated with 100 parts by volume of alcohol and 48.4 parts by weight are obtained of the N,N,N',N',3-pentamethyl-N,N'-diethyl-3-aza-pentylene-(1,5)-diammonium di-d-tartrate of the formula

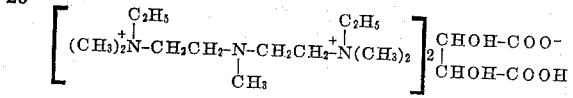

In the form of crystals which melt at 178–180° C. with decomposition.

From this compound tablets can be made by pressing a mixture thereof with e. g. the following ingredients:

|  | Mg. |
|---|---|
| The aforementioned di-d-tartrate | 170 |
| Gelatine | 2 |
| Starch | 50 |
| Lactose | 50 |
| Stearic acid | 3 |
| Talcum | 25 |
|  | 300 |

What is claimed is:

N,N,N',N',3 - pentamethyl - N,N' - diethyl - 3-aza-pentylene-(1,5)-diammonium di-d-tartrate.

KARL MIESCHER.
ADRIAN MARXER.

No references cited.